(12) United States Patent
Yang et al.

(10) Patent No.: US 11,545,728 B2
(45) Date of Patent: Jan. 3, 2023

(54) BATTERY CONTROL SYSTEM FOR A HYBRID OR ELECTRIC VEHICLE

(71) Applicant: FORD GLOBAL TECHNOLOGIES, LLC, Dearborn, MI (US)

(72) Inventors: Xiao Guang Yang, Northville, MI (US); Pratima Addepalli, Saline, MI (US); Bogdan Adrian Bude, Canton, MI (US); Xu Wang, Northville, MI (US); Connor McCann, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 17/089,024

(22) Filed: Nov. 4, 2020

(65) Prior Publication Data
US 2022/0140300 A1     May 5, 2022

(51) Int. Cl.
*H01M 50/578*    (2021.01)
*B60L 50/60*     (2019.01)
(Continued)

(52) U.S. Cl.
CPC ............ *H01M 50/578* (2021.01); *B60L 3/04* (2013.01); *B60L 50/60* (2019.02);
(Continued)

(58) Field of Classification Search
CPC ......... H01M 50/578; H01M 2200/103; H01M 2200/20; H01M 2220/20; B60L 3/04;
(Continued)

(56) References Cited

U.S. PATENT DOCUMENTS 7,893,652 B2 *   2/2011   Suzuki .............. H02J 7/0016
                                            320/132
8,981,721 B2 *   3/2015   Yamauchi ............ H02J 7/00
                                            320/134
(Continued)

FOREIGN PATENT DOCUMENTS

DE    102011002659 A1    7/2012
DE    102016221445 A1    5/2018
(Continued)

*Primary Examiner* — M Baye Diao
(74) *Attorney, Agent, or Firm* — David B Kelley; Brooks Kushman P.C.

(57) ABSTRACT

A vehicle includes an electric machine, a battery, an electrical circuit, an overcharge limit device, and a controller. The electric machine is configured to propel the vehicle. The battery has a plurality of cells and is configured to provide electrical power to the electric machine. The electrical circuit is configured to deliver the electrical power from the battery to the electric machine. The overcharge limit device is configured to individually disconnect each of the plurality cells from the circuit in response to an internal pressure of a respective cell exceeding a pressure threshold. The controller is programmed to, in response to detecting a first set of parameters that are indicative of a first of the cells being disconnected from the electrical circuit via the overcharge limit device, discontinue control the first of the cells.

20 Claims, 4 Drawing Sheets

(51) Int. Cl.
*B60L 3/04* (2006.01)
*H02J 7/00* (2006.01)

(52) U.S. Cl.
CPC .... *H02J 7/00302* (2020.01); *H02J 7/007194* (2020.01); *H01M 2200/103* (2013.01); *H01M 2200/20* (2013.01); *H01M 2220/20* (2013.01)

(58) Field of Classification Search
CPC ........ B60L 50/60; B60L 3/0046; B60L 58/15; B60L 58/21; B60L 2240/545; B60L 2240/547; B60L 2240/549; H02J 7/00302; H02J 7/007194; Y02T 10/70; Y02E 60/10
USPC ........................................................ 320/118
See application file for complete search history.

(56) References Cited

U.S. PATENT DOCUMENTS

| | | | | |
|---|---|---|---|---|
| 9,496,749 | B2 * | 11/2016 | Noda | H02J 7/1423 |
| 9,614,399 | B2 * | 4/2017 | Maeno | B60L 58/20 |
| 9,649,940 | B2 * | 5/2017 | Ryu | B60L 7/00 |
| 10,112,596 | B2 * | 10/2018 | Butcher | B60K 6/547 |
| 10,160,442 | B2 * | 12/2018 | Higashitani | B60W 10/30 |
| 10,589,732 | B2 * | 3/2020 | Ohkawa | B60W 20/40 |
| 10,597,027 | B2 * | 3/2020 | Oguma | B60W 10/08 |
| 10,696,292 | B2 * | 6/2020 | Suzuki | B60W 10/02 |
| 10,857,991 | B2 * | 12/2020 | Kava | B60W 50/085 |
| 10,955,479 | B2 * | 3/2021 | Nakao | H01M 10/42 |
| 11,167,661 | B2 * | 11/2021 | Wang | H02J 7/0029 |
| 11,214,278 | B2 * | 1/2022 | Hoop | B60L 7/22 |
| 11,292,346 | B2 * | 4/2022 | Duan | B60W 20/14 |
| 2005/0052159 | A1 * | 3/2005 | Moore | H02J 7/00308 320/134 |
| 2021/0354587 | A1 * | 11/2021 | Imura | B60L 1/00 |

FOREIGN PATENT DOCUMENTS

| | | | | |
|---|---|---|---|---|
| WO | WO-2013140605 | A1 * | 9/2013 | ............ B60L 58/12 |
| WO | WO-2020104013 | A1 * | 5/2020 | ............ B60L 58/18 |

* cited by examiner

BATTERY CONTROL SYSTEM FOR A HYBRID OR ELECTRIC VEHICLE

TECHNICAL FIELD

The present disclosure relates to hybrid/electric vehicles and batteries for hybrid/electric vehicles.

BACKGROUND

Hybrid/electric vehicles may be propelled by an electric machine that draws power from a battery.

SUMMARY

A vehicle includes an electric machine, a battery, an electrical circuit, an overcharge limit device, and a controller. The electric machine is configured to propel the vehicle. The battery has a plurality of cells and is configured to provide electrical power to the electric machine. The electrical circuit is configured to deliver the electrical power from the battery to the electric machine. The overcharge limit device is connected to the electrical circuit. The overcharge limit device has a plurality of switches and a plurality of fuses. Each switch is configured to short circuit one of the plurality of cells in response to an internal pressure of the one of the plurality of cells exceeding a pressure threshold. Each fuse is configured to disconnect one of the plurality of cells from the circuit in response to the one of the plurality of cells being short circuited. The controller is programmed to, in response to a voltage of a first of the cells decreasing from a first value to zero, the decrease in the voltage of the first of the cells being greater than a first voltage threshold, a first time period corresponding to the decrease in the voltage of the first of the cells from the first value to zero being less than a first time threshold, and a temperature of the first of the cells being less than a temperature threshold, resulting from a first of the switches short circuiting the first of the cells and a first of the fuses disconnecting the first of the cells from the circuit, discontinue control of the first of the cells and maintain operation of the remainder of the cells. The controller is further programmed to, in response to the voltage of the first of the cells decreasing from the first value to a second value that is greater than zero, or a second time period corresponding to the decrease in the voltage of the first of the cells from the first value to the second value or zero being greater than the first time threshold, not resulting from a first of the switches short circuiting the first of the cells and a first of the fuses disconnecting the first of the cells from the circuit, discontinue control of all of the battery cells. The controller is further programmed to, in response to the temperature of the first of the cells being greater than a second temperature threshold that is greater than the first temperature threshold, not resulting from a first of the switches short circuiting the first of the cells and a first of the fuses disconnecting the first of the cells from the circuit, discontinue control of all of the battery cells.

A vehicle includes an electric machine, a battery, an electrical circuit, an overcharge limit device, and a controller. The electric machine is configured to propel the vehicle. The battery has a plurality of cells and is configured to provide electrical power to the electric machine. The electrical circuit is configured to deliver the electrical power from the battery to the electric machine. The overcharge limit device is configured to individually disconnect each of the plurality cells from the circuit in response to an internal pressure of a respective cell exceeding a pressure threshold. The controller is programmed to, in response to detecting a first set of parameters that are indicative of a first of the cells being disconnected from the electrical circuit via the overcharge limit device, discontinue control the first of the cells and maintain operation of the remainder of the cells. The controller is further programmed to, in response to detecting a second set of parameters that are indicative of a battery fault, discontinue control of all of the battery cells.

A vehicle includes an electric machine, a battery, an electrical circuit, an overcharge limit device, and a controller. The electric machine is configured to propel the vehicle. The battery has a plurality of cells and is configured to provide electrical power to the electric machine. The electrical circuit is configured to deliver the electrical power from the battery to the electric machine. The overcharge limit device is configured to individually disconnect each of the plurality cells from the circuit in response to an internal pressure of a respective cell exceeding a pressure threshold. The controller is programmed to, in response to detecting a first set of parameters that are indicative of a first of the cells being disconnected from the electrical circuit via the overcharge limit device, discontinue control of the first of the cells and maintain operation of the remainder of the cells, exclude the first of the cells from a charge balancing operation, and decrease a power output limit of the battery.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
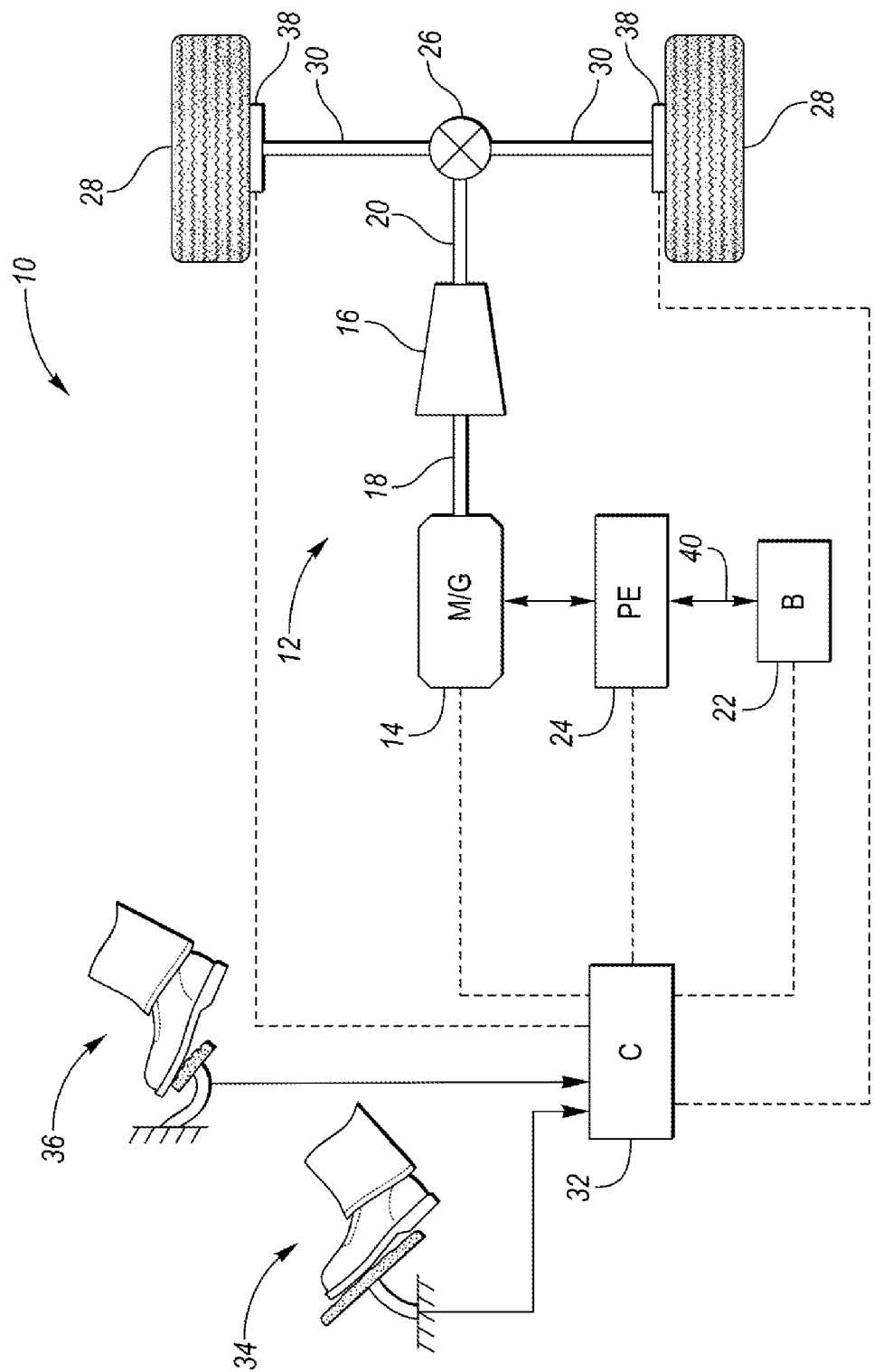
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Figure 2:
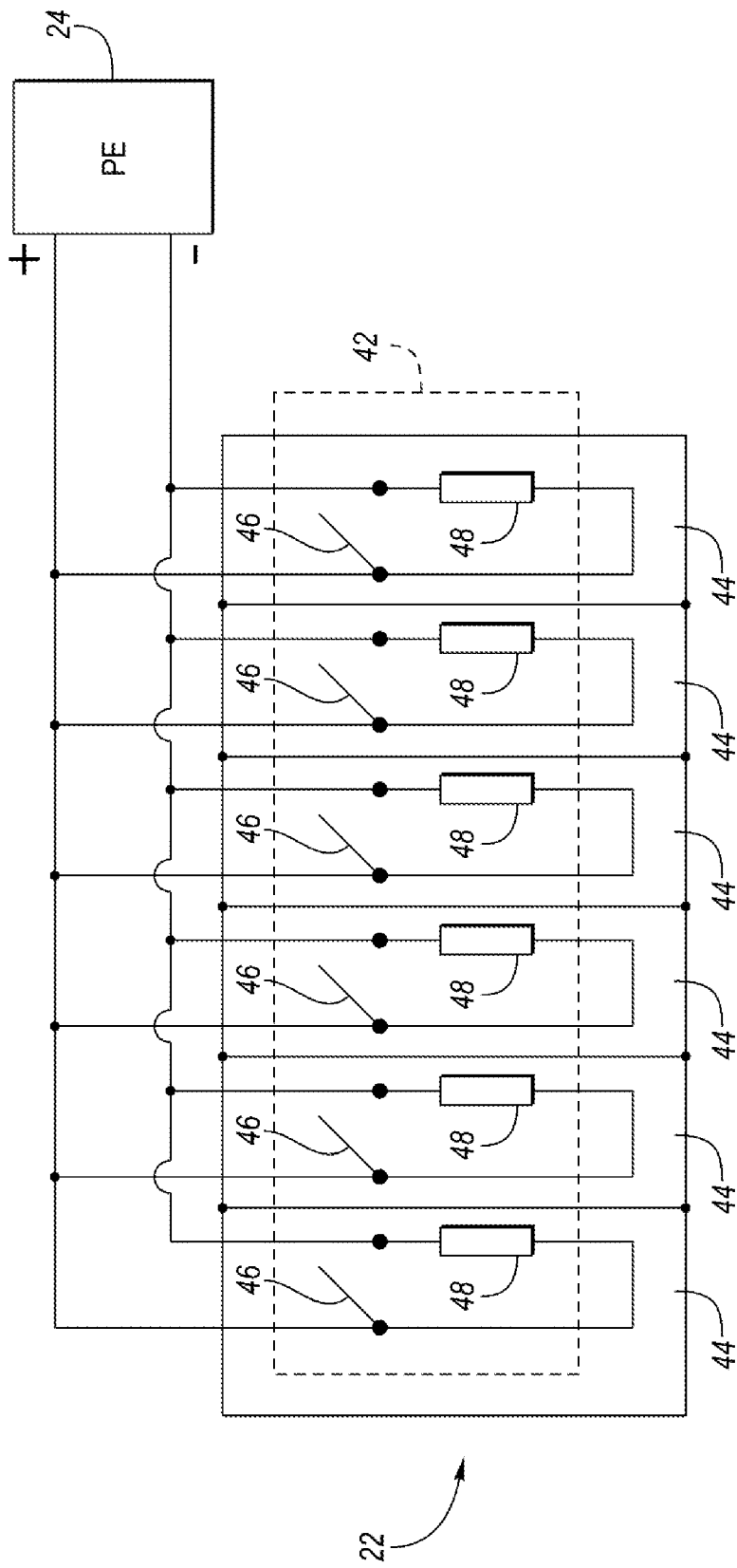
FIG. 2 is a schematic illustration of an overcharge limit device for battery cells.

Referring to FIG. 2, an overcharge limit 42 device for the cells 44 of the battery 22 is illustrated. Although only six cells are illustrated, it should be understood that the battery 22 may have any number of cells. The overcharge limit device 42 is connected to the electrical circuit that includes the battery 22 and the power electronics 24. The overcharge limit device has a plurality of switches 46 and a plurality of fuses 48. Each switch 46 is configured to close and short circuit one of the cells 44 in response to an internal pressure of the gas or fluid within the cell 44 exceeding a pressure threshold. Each switch 46 may be a pressure-induced switch that is closed once the gas or fluid pressure within a respective battery cell 44 exceeds the pressure threshold. Alternatively, each switch 46 may be in communication with the controller 32 and each cell 44 may include a pressure sensor that communicates with the controller 32, and the controller 32 may command the switches 46 to close in response to a respective pressure sensor sending a signal to the controller 32 that is indicative of the gas or fluid pressure within the respective cell 46 exceeding the pressure threshold. Each fuse 48 is configured to disconnect one of the cells 44 from the electrical circuit in response to the cell 46 being short circuited via the respective switch 46 being closed.

Figure 3:
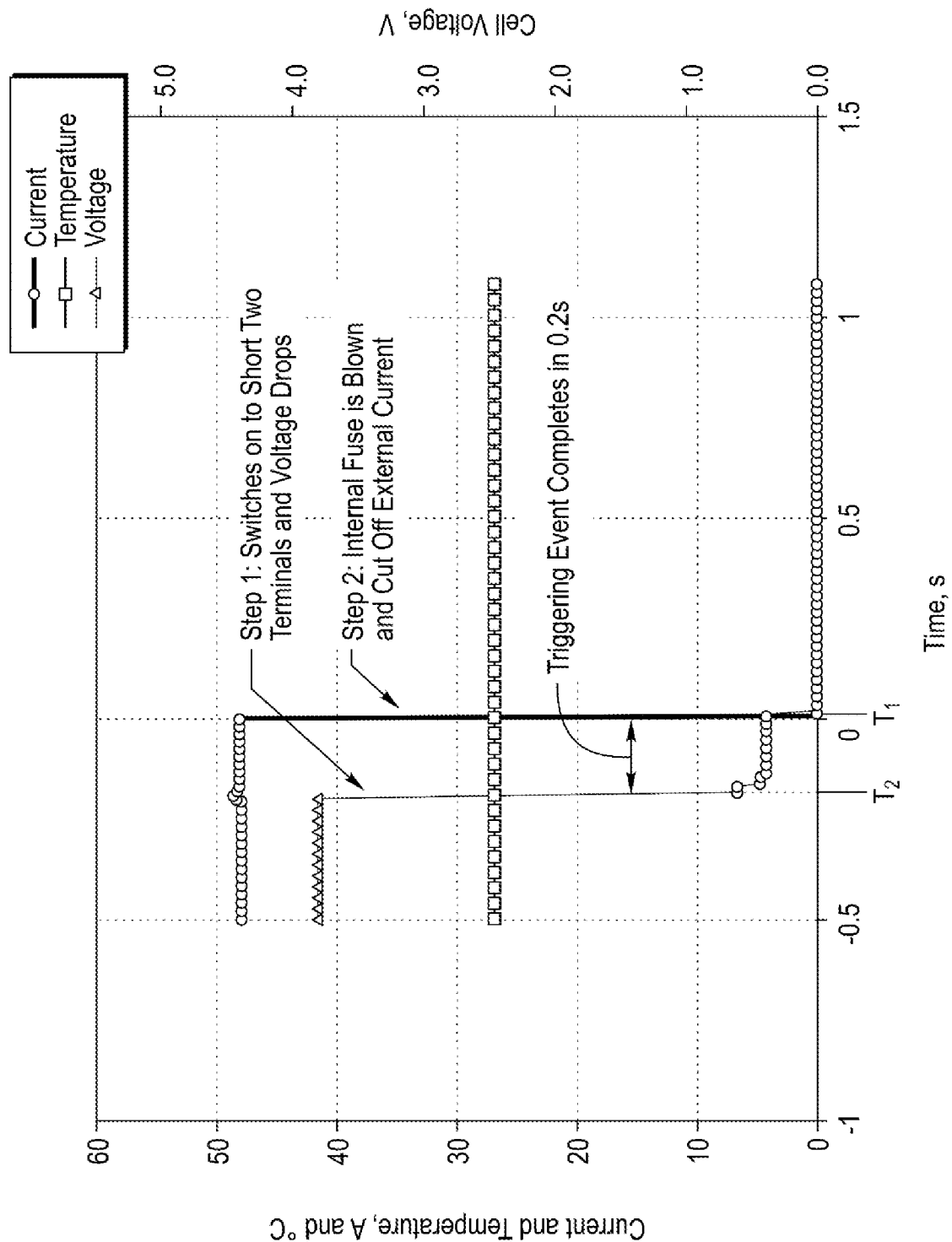
FIG. 3 is a series of graphs illustrating the current, voltage, and temperature of a battery cell before and after the activation of the overcharge limit device for the battery cell.

As illustrated in FIG. 3, a fuse 48 disconnects a respective cell 44 from the electrical circuit at time $t_1$ in a short period of time after a respective switch 46 has been closed at time $t_2$. Once the switch 46 is closed, the electrical voltage of the cell 46 immediate drops and within the short period of time after the respective switch 46 is closed (i.e., the time between time $t_2$ and $t_1$, which is approximately 0.2 seconds), the fuse 48 blows and the electrical current being output from the cell 44 immediately drops to zero.

Figure 4:
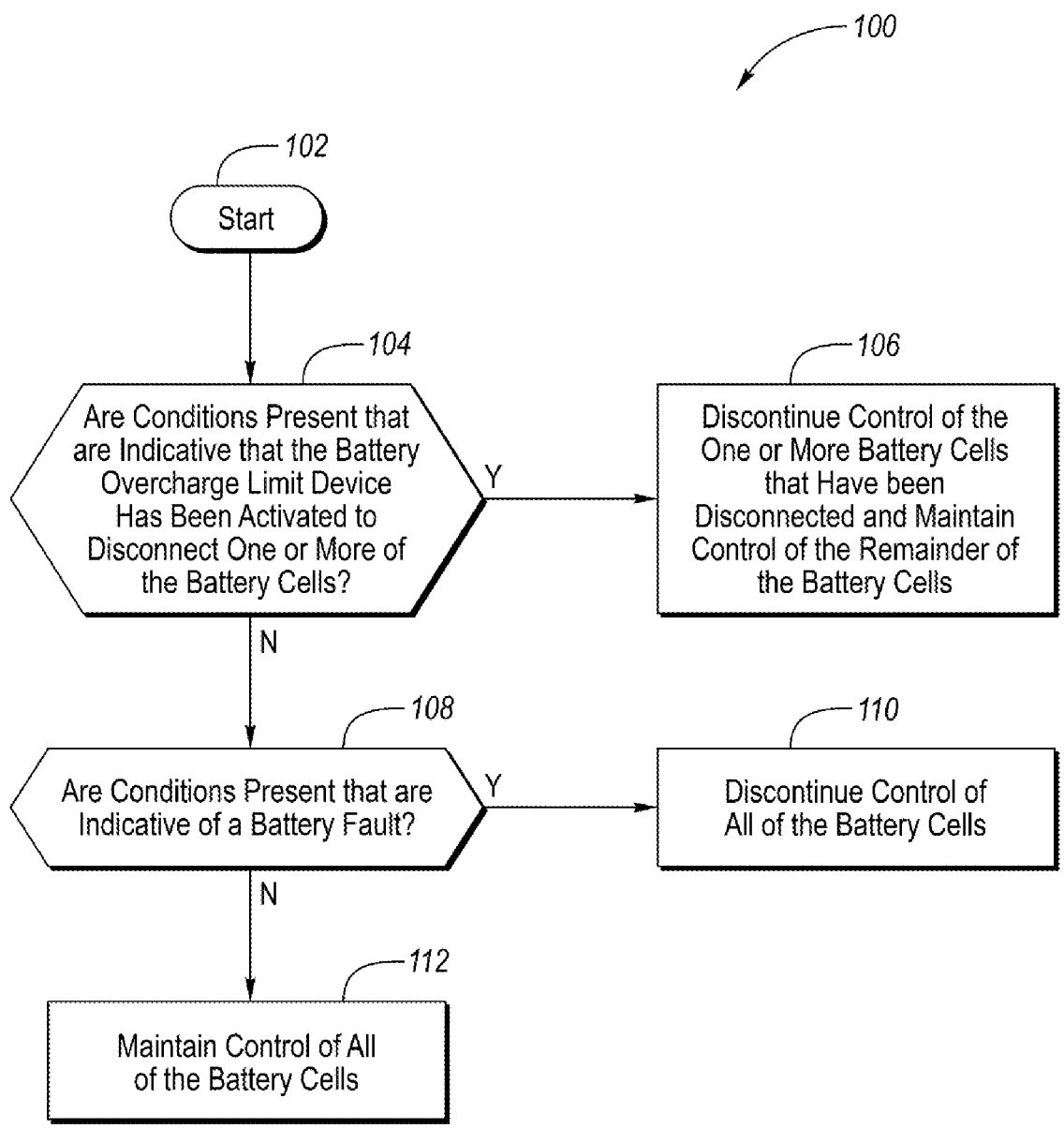
FIG. 4 is a flowchart illustrating a method of controlling various functions of the battery in the electric vehicle, including the power flowing into and out of the cells of the battery.

Referring to FIG. 4, a method 100 of controlling various functions of the battery 22, including the power flowing into and out of the cells 44 of the battery 22 are illustrated. The method 100 may be stored as control logic and/or an algorithm within the controller 32. The controller 32 may implement the method 100 by controlling the various components of the vehicle 10. The method 100 is initiated at start block 102. The method 100 may be initiated at start block 102 by turning a start key or ignition of the vehicle 10 to an "on" position. The method 100 then moves on to block 104 where the controller 32 determines if conditions are present or a first set of parameters have been detected that are indicative that the battery overcharge limit device 42 has been activated to disconnect one or more of the cells 44 of the battery 22.

The conditions or the first set of parameters that are indicative that the battery overcharge limit device 42 has been activated to disconnect a cell 44 of the battery 22 include: (1) a voltage of the cell 44 decreasing from a first value to zero, or to within a tolerance from zero; (2) the decrease in the voltage of the cell from the first value to zero, or to within the tolerance from zero, being greater than a first voltage threshold (e.g., a drop that is more than 2.5 Volts); (3) a first time period corresponding to the decrease in the voltage of the cell 44 from the first value to zero, or to within the tolerance from zero, being less than a first time threshold (e.g., less than one second); and (4) a temperature of the cell 44 being less than a first temperature threshold (e.g., the temperature of the cell being less than 65° C.). Each of the cells may include sensors, such as voltage, current, and temperature sensors, that communicate the values of such parameters back to the controller 32.

If conditions are present or the first set of parameters have been detected that are indicative that the battery overcharge limit device 42 has been activated to disconnect one or more of the cells 44 of the battery 22, the method 100 moves on to block 106, where the controller 32 discontinues control of the one or more battery cells 44 that have been disconnected via the overcharge limit device 42 and maintains operation of the remainder of the battery cells 44 that have not been disconnected.

The controller 32 may also be configured to decrease power inputs and power outputs to and from the battery 22 from desired power inputs and outputs in order to compensate for the battery 22 being limited to operate on less than all of the battery cells 44 at block 106. For example, if the vehicle operator is depressing the accelerator pedal 34 and the position of the accelerator pedal corresponds to a desired power output of the battery 22, the actual power output of the battery may be decreased to the less than the desired power output since the battery 22 is operating on less than all of the cells 44. As another example, if the vehicle operator is depressing the brake pedal 36 that corresponds to a desired power input to the battery 22 via regenerative braking, the actual power input into the battery may be decreased to the less than the desired power input since the battery 22 is operating on less than all of the cells 44. Additionally, the controller 32 may also be configured to decrease a power input limit and a power output limit to and from the battery 22 (i.e., the controller 32 may be configured to decrease maximum power values that may flow into and out of the battery 22).

Also, at block 106 the controller 32 may be programmed to exclude any of the cells 44 that have been disconnected via the overcharge limit device 42 from being considered during a cell charge balancing operation. The controller 32 may be programmed to charge or discharge individual cells 44 within the battery 22 to ensure that charge levels or voltage levels of each cell 44 are within a tolerable range relative to the other cells 44. Once a cell 44 has been disconnected via the overcharge limit device 42, the controller 32 may continue to perform such a cell charge balancing operation on the remainder of the battery cells 44 that have not been disconnected without taking into consideration the cells 44 that have been disconnected via the overcharge limit device 42 (i.e., the controller 32 will not attempt to charge or discharge the disconnected cells 44 during a cell charge balancing operation nor will the controller 32 consider the disconnected cells 44 in an algorithm that is utilized to determined which cells will be charged or discharged during a cell charge balancing operation).

Additionally, any online learning or learning algorithm that the controller 32 may utilize to update control parameters of the battery 22 (e.g., power capability, power capacity, energy storage, state of charge, etc.) may cease to operate when the battery 22 is operating while one or more of the cells 44 is shutdown, due to the one or more the cells 44 being disconnected via the overcharge limit device 42. More specifically, such control parameters may be "frozen" at current values once the battery 22 begins operating while one or more of the cells 44 is shutdown.

It should also be noted that if the number of cells 44 that have been disconnected via the overcharge limit device 42 exceeds a threshold number, the controller 32 may be configured to override the command at block 106 and shutdown all control of the battery 22 (i.e., the controller 32 may shutdown power going into and out of all of the battery cells 44).

Returning to block 104, if conditions are not present or the first set of parameters have not been detected that are indicative that the battery overcharge limit device 42 has been activated to disconnect one or more of the cells 44 of the battery 22, the method 100 moves on to block 108, where the controller 32 determines if conditions are present or a second set of parameters have been detected that are indicative of a battery fault, but are not indicative of the battery overcharge limit device 42 disconnecting one or more of the cells 44.

The conditions or the second set of parameters that are indicative of a battery fault include: (1) the voltage of one or more cell 44 decreasing from the first value to a second value, where the second value is greater than zero or is greater than the tolerance from zero; (2) a second time period corresponding to a decrease in the voltage of one or more cells 44 from the first value to the second value or to zero being greater than the first time threshold; or (3) the temperature of one or more of the cells 44 being greater than a second temperature threshold (e.g., the temperature of the cell being greater than 70° C.). The second temperature threshold may be greater than the first temperature threshold so that the controller 32 is able to distinguish between an event triggered by the battery overcharge limit device 42 (i.e., an event where one or more cells 44 have been disconnected) and an event triggered by an undesirable thermal condition of the battery 22 (e.g., an overheating condition of the battery 22), such as a nail penetrating the battery 22. The voltage of the one or more of the cells 44 decreasing from the first value to the second value or the second time period being greater than the first time threshold may be indicative of an over discharge fault of the battery 22 (i.e., a fault due to the battery 22 being discharged below a lower limit required to operate the battery 22) or may be indicative of a cell deviation fault that corresponds to a difference in voltage between two or more of the battery cells 44 exceeding a voltage threshold.

If conditions are present or the second set of parameters have been detected that are indicative of a battery fault, the method 100 moves on to block 110 where the controller 32 discontinues control of all of the battery cells 44 of the battery 22 (i.e., the controller 32 shuts down the battery 22). If conditions are not present or the second set of parameters have not been detected that are indicative of a battery fault, the method 100 moves on to block 112 where the controller 32 maintains control of all of the battery cells 44 of the battery 22.

It should be understood that the flowchart in FIG. 4 is for illustrative purposes only and that the method 100 should not be construed as limited to the flowchart in FIG. 4. Some of the steps of the method 100 may be rearranged while others may be omitted entirely. It should be understood that the designations of first, second, third, fourth, etc. for any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to propel the vehicle;
   a battery having a plurality of cells and configured to provide electrical power to the electric machine;
   an electrical circuit configured to deliver the electrical power from the battery to the electric machine;
   an overcharge limit device connected to the electrical circuit, the overcharge limit device having a plurality of switches and a plurality of fuses, each switch configured to short circuit one of the plurality of cells in response to an internal pressure of the one of the plurality of cells exceeding a pressure threshold and each fuse configured to disconnect one of the plurality of cells from the circuit in response to the one of the plurality of cells being short circuited; and
   a controller programmed to,
      in response to a voltage of a first of the cells decreasing from a first value to zero, the decrease in the voltage of the first of the cells being greater than a first voltage threshold, a first time period corresponding to the decrease in the voltage of the first of the cells from the first value to zero being less than a first time threshold, and a temperature of the first of the cells being less than a temperature threshold, resulting from a first of the switches short circuiting the first of the cells and a first of the fuses disconnecting the first of the cells from the circuit, discontinue control of the first of the cells and maintain operation of the remainder of the cells,
      in response to the voltage of the first of the cells decreasing from the first value to a second value that is greater than zero, or a second time period corresponding to the decrease in the voltage of the first of the cells from the first value to the second value or zero being greater than the first time threshold, not resulting from a first of the switches short circuiting the first of the cells and a first of the fuses disconnecting the first of the cells from the circuit, discontinue control of all of the battery cells, and
      in response to the temperature of the first of the cells being greater than a second temperature threshold that is greater than the first temperature threshold, not resulting from a first of the switches short circuiting the first of the cells and a first of the fuses disconnecting the first of the cells from the circuit, discontinue control of all of the battery cells.

2. The vehicle of claim 1, wherein the controller is further programmed to, in response to discontinuing control of the first of the cells, decrease a power output limit of the battery.

3. The vehicle of claim 1, wherein the controller is further programmed to, in response to a charge balancing operation while control of the first of the cells is discontinued, exclude the first of the cells from the charge balancing operation.

4. The vehicle of claim 1, wherein the voltage of the first of the cells decreasing from the first value to the second value or the second time period being greater than the first time threshold is indicative of an over discharge of the battery.

5. The vehicle of claim 1, wherein the voltage of the first of the cells decreasing from the first value to the second value or the second time period being greater than the first time threshold is indicative of a cell deviation fault that corresponds to a difference in voltage between two or more of the battery cells exceeding a third voltage threshold.

6. The vehicle of claim 1, wherein the temperature of the first of the cells being greater than the second temperature threshold is indicative of a thermal condition of the battery.

7. A vehicle comprising:
   an electric machine;
   a battery having a plurality of cells;
   an electrical circuit configured to deliver electrical power from the battery to the electric machine;
   an overcharge limit device configured to individually disconnect each of the plurality cells from the circuit in response to an internal pressure of a respective cell exceeding a pressure threshold; and
   a controller programmed to,
      in response to detecting a first set of parameters that are indicative of a first of the cells being disconnected from the electrical circuit via the overcharge limit device, discontinue control the first of the cells and maintain operation of the remainder of the cells, and
      in response to detecting a second set of parameters that are indicative of a battery fault, discontinue control of all of the battery cells.

8. The vehicle of claim 7, wherein the first set of parameters includes a voltage of the first of the cells decreasing from a first value to zero.

9. The vehicle of claim 8, wherein the first set of parameters includes the decrease in the voltage of the first of the cells being greater than a first voltage threshold.

10. The vehicle of claim 8, wherein the first set of parameters includes a first time period corresponding to the decrease in the voltage of the first of the cells from the first value to zero being less than a first time threshold, and wherein the second set of parameters includes the voltage of the first of the cells decreasing from the first value to a second value that is greater than zero, or a second time period corresponding to the decrease in the voltage of the first of the cells from the first value to the second value or zero being greater than the first time threshold.

11. The vehicle of claim 7, wherein the first set of parameters includes a temperature of the first of the cells being less than a temperature threshold.

12. The vehicle of claim 7, wherein the controller is further programmed to, in response to discontinuing control of the first of the cells, decrease a power output limit of the battery.

13. The vehicle of claim 7, wherein the controller is further programmed to, in response to a charge balancing operation while control of the first of the cells is discontinued, exclude the first of the cells from the charge balancing operation.

14. The vehicle of claim 7, wherein the battery fault is an over discharge of the battery.

15. The vehicle of claim 7, wherein the battery fault is a cell deviation fault that corresponds to a difference in voltage between two or more of the battery cells exceeding a voltage threshold.

16. The vehicle of claim 7, wherein the battery fault is a thermal condition of the battery.

17. A vehicle comprising:
an electric machine configured to propel the vehicle;
a battery having a plurality of cells and configured to provide electrical power to the electric machine;
an electrical circuit configured to deliver the electrical power from the battery to the electric machine;
an overcharge limit device configured to individually disconnect each of the plurality cells from the circuit in response to an internal pressure of a respective cell exceeding a pressure threshold; and
a controller programmed to, in response to detecting a first set of parameters that are indicative of a first of the cells being disconnected from the electrical circuit via the overcharge limit device, discontinue control of the first of the cells and maintain operation of the remainder of the cells, exclude the first of the cells from a charge balancing operation, and decrease a power output limit of the battery.

18. The vehicle of claim 17, wherein the controller is further programmed to, in response to detecting a second set of parameters, which are indicative of a battery fault, discontinue control of all the battery cells.

19. The vehicle of claim 18, wherein the first set of parameters includes a voltage of a first of the cells decreasing from a first value to zero, the decrease in the voltage of the first of the cells being greater than a first voltage threshold, a first time period corresponding to the decrease in the voltage of the first of the cells from the first value to zero being less than a first time threshold, and a temperature of the first of the cells being less than a temperature threshold.

20. The vehicle of claim 19, wherein the second set of parameters includes the voltage of the first of the cells decreasing from the first value to a second value that is greater than zero, a second time period corresponding to the decrease in the voltage of the first of the cells from the first value to the second value or zero being greater than the first time threshold, or the temperature of the first of the cells being greater than a second temperature threshold that is greater than the first temperature threshold.

* * * * *